United States Patent [19]
Sharpe, III et al.

[11] Patent Number: 5,851,119
[45] Date of Patent: Dec. 22, 1998

[54] INTERACTIVE STORY BOOK AND METHODS FOR OPERATING THE SAME

[75] Inventors: Henry D. Sharpe, III, Saunderstown; Ralph A. Beckman, Providence; Stephen A. Schwartz, Providence; Stanley O. Thompson, Providence; Dan R. Morrissey, Foster, all of R.I.

[73] Assignee: Stephen A. Schwartz and Design Lab, LLC

[21] Appl. No.: 726,611

[22] Filed: Oct. 7, 1996

Related U.S. Application Data

[62] Division of Ser. No. 373,386, Jan. 17, 1995, Pat. No. 5,636,995.

[51] Int. Cl.$^6$ ..................................... G09B 5/00
[52] U.S. Cl. ..................... 434/317; 434/169; 434/308; 434/362
[58] Field of Search ...................... 434/156–159, 434/169, 178, 185, 201, 259, 307 R, 308, 317, 322–327, 337, 339, 350, 362, 365; 341/34; 200/5 A, 519; 462/17, 55; 40/409, 411, 427; 178/18, 19; 345/168, 173, 901; 273/236–239, 272; 84/719, 423 R

[56] References Cited

U.S. PATENT DOCUMENTS

| | | | |
|---|---|---|---|
| 3,729,837 | 5/1973 | Tarnopolsky et al. | 434/339 |
| 3,795,985 | 3/1974 | Greenberg et al. | 434/339 |
| 4,121,355 | 10/1978 | Kimoto et al. | 434/308 |
| 4,288,537 | 9/1981 | Knetzger | 434/169 |
| 4,403,965 | 9/1983 | Hawkins | 434/327 |
| 4,706,536 | 11/1987 | Sanders | 84/719 |
| 4,752,230 | 6/1988 | Shimizu | 434/317 |
| 4,818,827 | 4/1989 | Ipcinski et al. | 434/339 X |
| 4,990,092 | 2/1991 | Cummings . | |
| 5,087,043 | 2/1992 | Billings et al. | 434/327 X |
| 5,088,928 | 2/1992 | Chan | 434/339 |
| 5,127,869 | 7/1992 | Hanzawa | 446/397 |
| 5,161,977 | 11/1992 | Thomas, Jr. | 434/322 |
| 5,174,759 | 12/1992 | Preston et al. | 434/317 X |
| 5,188,533 | 2/1993 | Wood | 434/169 |
| 5,209,665 | 5/1993 | Billings et al. | 434/169 |
| 5,277,429 | 1/1994 | Smith, III | 463/10 |
| 5,407,357 | 4/1995 | Cutler | 434/335 |
| 5,413,355 | 5/1995 | Gonzalez | 273/429 |
| 5,433,610 | 7/1995 | Godfrey et al. | 434/308 X |
| 5,437,552 | 8/1995 | Baer et al. | 434/317 |
| 5,466,158 | 11/1995 | Smith, III | 434/317 |
| 5,474,457 | 12/1995 | Bromley | 434/311 |

FOREIGN PATENT DOCUMENTS

WO94/08324  4/1994  WIPO ................................. 434/317

*Primary Examiner*—Joe H. Cheng
*Attorney, Agent, or Firm*—Barlow, Josephs & Holmes, Ltd.

[57] ABSTRACT

An interactive electronic graphics tablet is provided which utilizes two windows, one large window for the insertion of a standard sheet of paper or other material allowing the user to draw images on the paper and another smaller second window. A cartridge having various icons, such as animal images, is clicked into place in the smaller window. The device is configured such that the paper overlays a touch sensitive pad. The operation of the present invention allows the user to assign any cell of the drawn page corresponding to XY coordinates to particular sounds correlated to the icons in the smaller second window by touching respective locations and icons.

5 Claims, 12 Drawing Sheets

INTERACTIVE STORY BOOK AND METHODS FOR OPERATING THE SAME

This is a divisional application of application Ser. No. 08/373,386, filed Jan. 17, 1995, now U.S. Pat. No. 5,636,995.

BACKGROUND OF THE INVENTION

The present invention relates to an electronic interactive graphics tablet. In particular, it relates to an electronic interactive graphics tablet that permits the user to correlate a particular sound effect, including music and conversational voice effects, with a specific area of both pre-printed and user-drawn images. In addition, the present invention also will permit some sound effects to be pre-correlated with a particular graphic.

Graphics and sound interactive devices are well known in the art. Such devices typically use pre-printed graphics in conjunction with an audio synthesizer. For example, audio-visual "picture books" are known, in which a picture book, with text and graphics, is provided along with a mechanism for producing sound effects related to the image on a particular page of the book. Typically, sound icons are provided, bearing graphical images corresponding to the book's graphics. When pressed, the icons cause a sound effect to be emitted, which is related to an image in the book.

However, such devices do not provide the ability to correlate and generate a user-chosen sound or audio effect in association with a user-chosen portion of a given graphical image. Moreover, such devices do not allow the user to draw or otherwise create his own graphic. As such, because of their dependency upon pre-printed graphical images, these devices are limited in their ability to stimulate the user's independent creativity. Also, such devices do not provide for expansion of the library of available sounds, and also do not provide, for example, for the use of more than one "talking book". Accordingly, there is a need for an electronic interactive graphical interface which permits the assignment or correlation of auditory stimuli such as sound effects, voice effects, melodies or other audio effects to a particular portion of an image and, particularly, to an image drawn by the user. There is a further need for an electronic graphics tablet that permits the user to expand the library of available sounds and images.

SUMMARY OF THE INVENTION

Accordingly, it is an object of the invention to overcome the aforementioned limitations in the prior art.

It is an object of the present invention to provide an electronic interactive graphics tablet that allows the user to assign or correlate user-chosen sounds to a user-chosen portion of a given graphical image.

It is a further object of the invention to provide an electronic interactive graphics tablet that allows the user to assign or correlate a user-chosen sound with a portion of a graphical image drawn or created by the user himself.

It is a further object of the present invention to provide an electronic interactive graphics tablet that permits the user to expand the library of available sounds.

It is a further object of the invention to provide an electronic interactive graphics tablet that permits the user to draw on a standard drawing material with conventional drawing tools.

In accordance with one embodiment of the present invention, an interactive electronic graphics tablet is provided that allows the user to select a sound effect, and assign it to a place on either a pre-printed or user-drawn graphic. The interactive electronic graphics tablet in accordance with the present invention utilizes two windows, one large window for the insertion of a standard sheet of paper or other material allowing the user to draw images on the paper and another, smaller, second window. Interchangeable cartridges are provided which allow the user to expand the available library of sound effects. A cartridge having various icons, such as animal images, is clicked into place in the smaller window. The device is configured such that the drawing material, such as paper, overlays a touch sensitive pad. The operation of the present invention allows the user to assign any cell of a drawn page corresponding to XY coordinates to particular sound or audio effects correlated to the icons in the smaller second window by touching respective icons and locations. Then, the user can cause the effect to be generated at any time by touching the respective area on the drawing.

The invention itself together with the objects and attended advantages will be best understood by reference to the following descriptions taken in connection with the accompanying drawings. Additional objects and advantages of the invention will become apparent from the description that follows and may be learned by practice of the invention. The objects and advantages of the invention will be realized and attained by means of the elements and combinations particularly pointed out in the appended claims. It is understood therefore that both the foregoing general and the following detailed descriptions are exemplary only and not restrictive of the invention as claimed.

DETAILED DESCRIPTION OF THE PREFERRED EMBODIMENT

Figure 1:
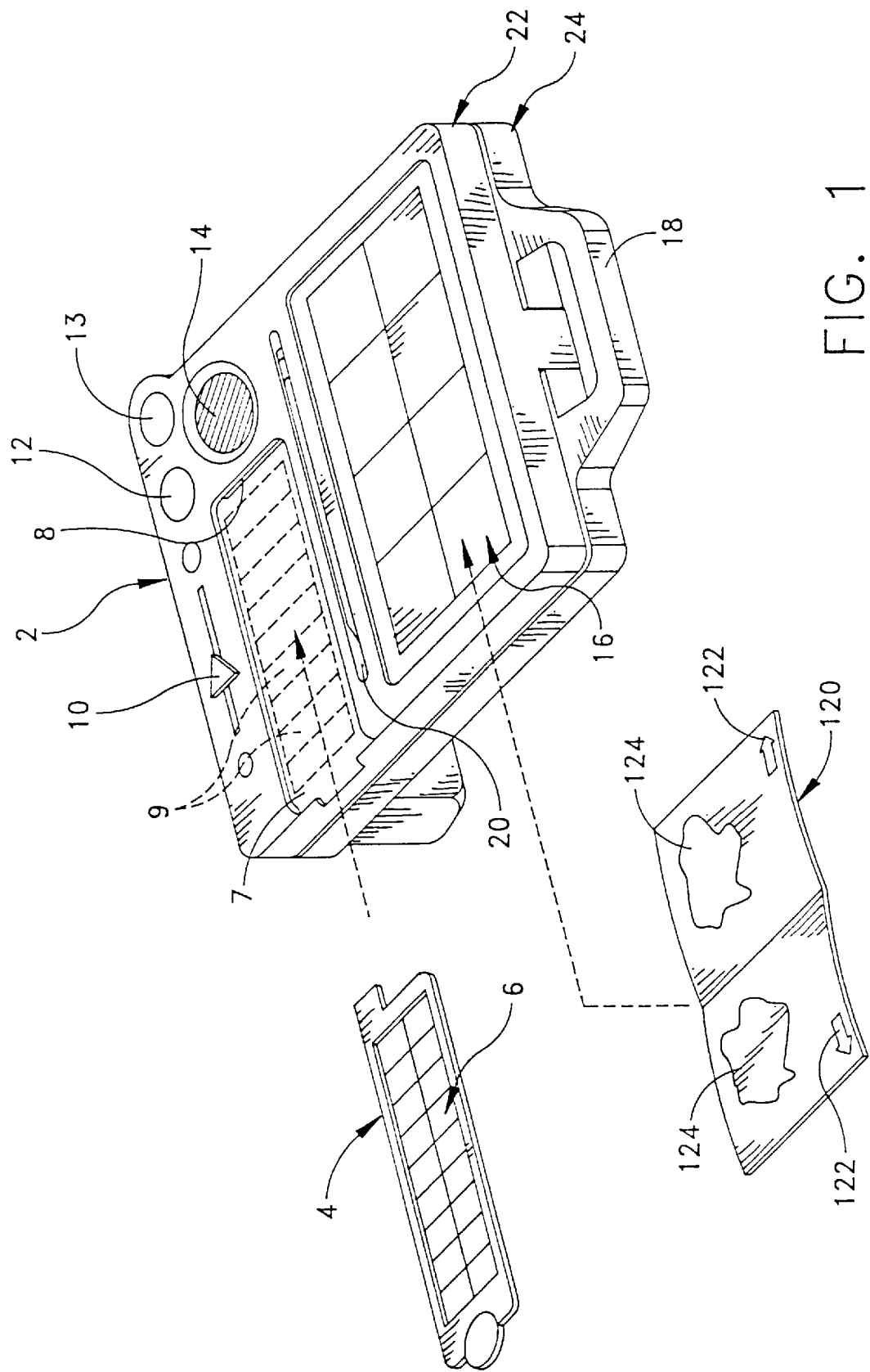
FIG. 1 is a perspective of one embodiment of the present invention.
Figure 3A:
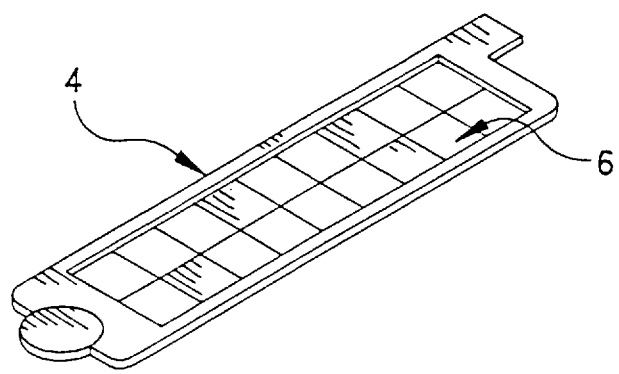
FIG. 3a and FIG. 3b are perspectives of exemplary interchangeable cartridges.
Figure 3B:
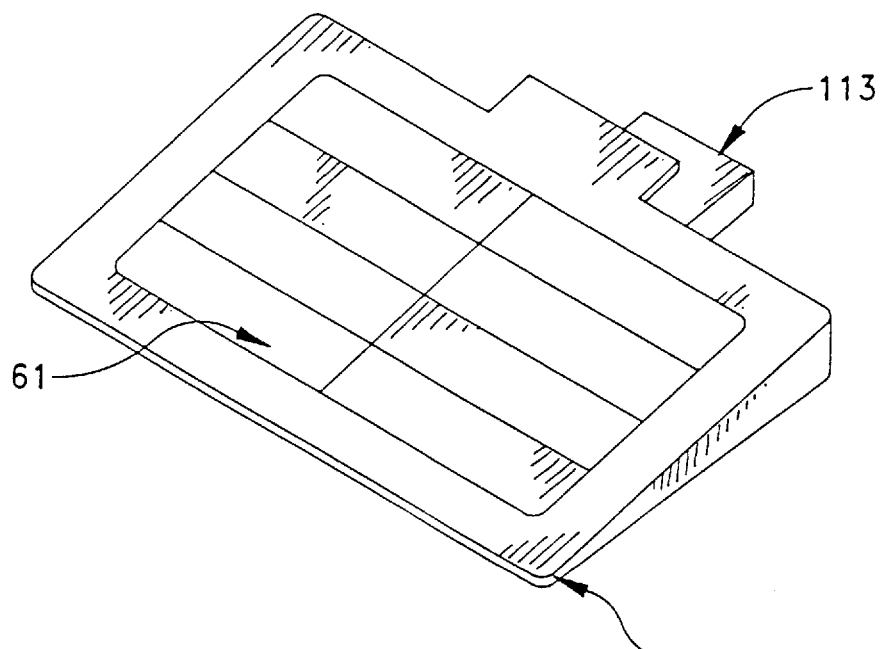
Figure 4:
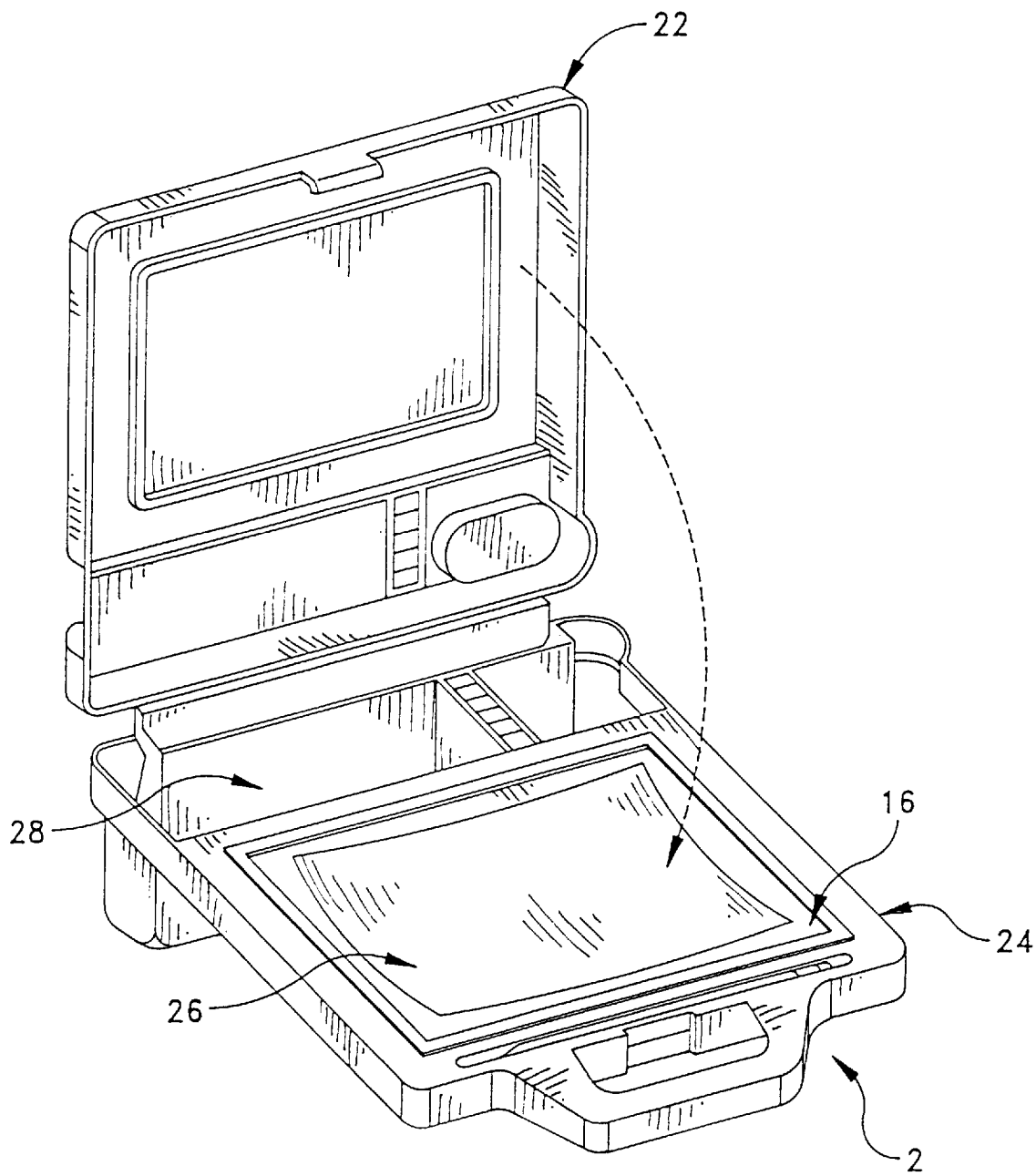
FIG. 4 is a perspective showing access to internal compartments and securing of the graphics-ready material.

One embodiment of the present invention, FIG. 1, denoted by the numeral 2, includes a base 24 and a removable lid 22 which form a housing. Lid 22 permits graphics-ready material 26, such as paper, to be secured upon graphics tablet 16. The embodiment shown in FIG. 1 also permits internal storage 28 (See FIG. 4) of graphics supplies or interchangeable cartridges 4, 41 (FIGS. 3a, 3b). Inside the unit 2 is a PC board containing electronic circuitry (see FIG. 6), including a controller 106, typically a microprocessor, and memory device 118 for control and speech processing. Memory device 118 is typically non-volatile memory of some type such read-only-memory (ROM). Memory device 118 need not be separate from controller 106. Typically, various sound effects are stored either in memory device 118 or on-board controller 106.

The embodiment of the present invention shown in FIG. 1 further includes a carrying handle 18 and pencil tray 20.

It further includes multiple control switches 10, 12, 13 and a speaker 14. Control switches include an on-off switch and others that permit adjustment of various parameters, including, for example, volume. The embodiment of the present invention shown in FIG. 1 further includes a selection window 7, adapted to receive cartridges 4, bearing sound icons 6 and possibly control keys, to unit 2 by means of port 8. Selection window 7 can also include a multiple-key membrane switch 9. Since sound icons 6 are coupled to controller 106, they are used to correlate a given sound effect with a portion of graphics tablet 16.

A basic embodiment of the present invention is intended to be used in the following way: A standard piece of graphics-ready material, such as paper 26, is inserted onto graphics tablet 16 by removing lid 22 and thereafter securing it back down. A particular sound may be user-selected by pressing a particular descriptive icon 6, and hence a particular key on an underlying membrane switch 9. When the icon 6 is pressed, a corresponding sound plays. The user can choose a different sound by pressing a different icon 6. Once the desired sound is selected, it may be assigned to or correlated with a portion of the drawing or graphic by simply touching the drawing, which overlies the touch sensitive graphics tablet 16. Every time thereafter that that position is touched, the assigned sound will play. The process may be continued indefinitely. In addition, sounds may be changed, erased and new ones applied at any time. Drawing also can continue. In one embodiment of the present invention, it is possible to record the sounds for a completed "sound picture", using a standard memory device, and save them for later playback.

A flowchart for the software of the embodiment described in FIG. 1 is shown in FIG. 2. FIG. 2a shows the Main routine that correlates a particular icon with a position on the graphics area 16. Once the unit 2 is turned on, if there is no time-out, the main routine calls the Membrane Service routine, FIG. 2b.

Figure 2A:
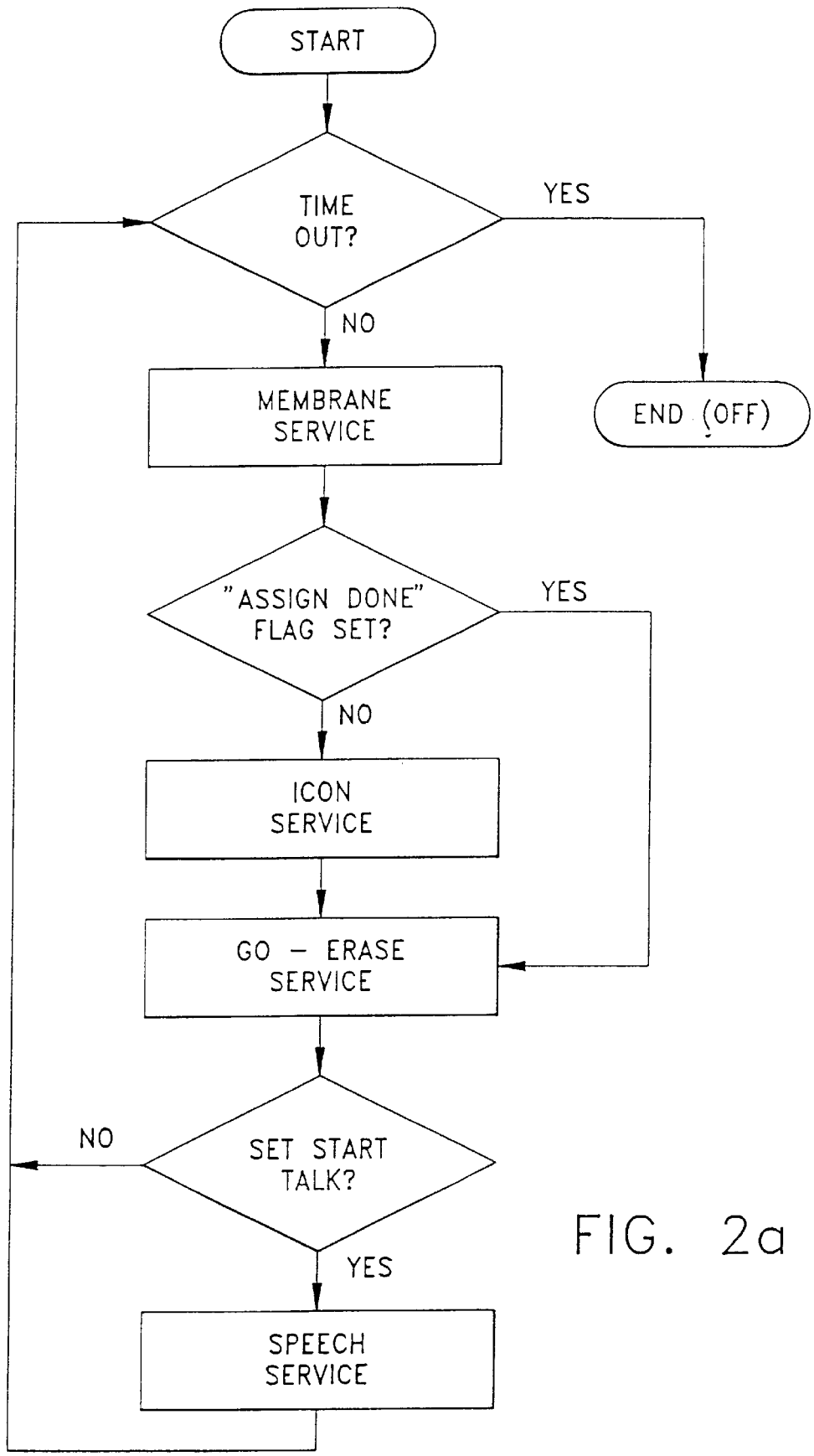
FIGS. 2a–e is a flow chart showing operation of the software for the present invention as embodied in FIG. 1.
Figure 2B:
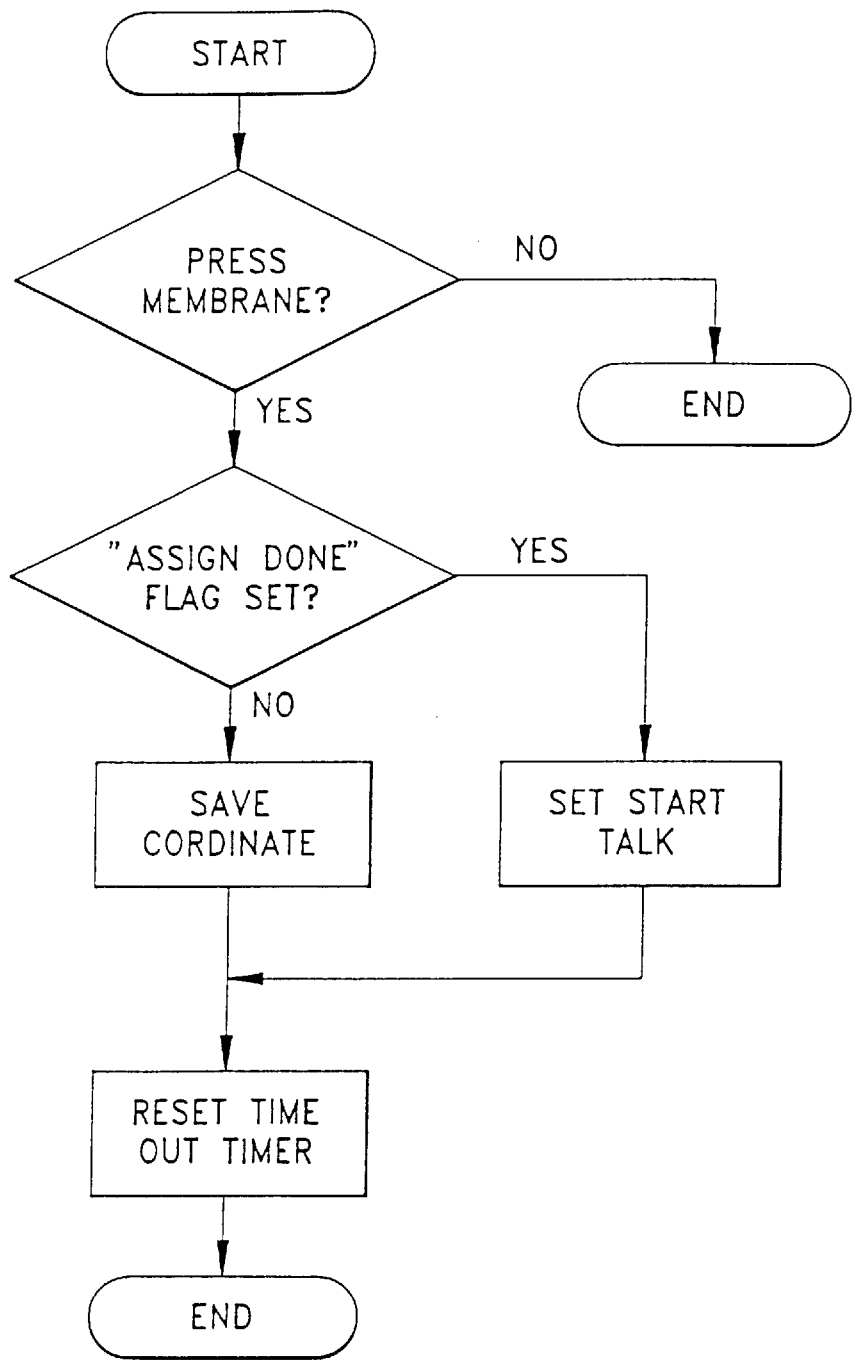
Figure 2C:
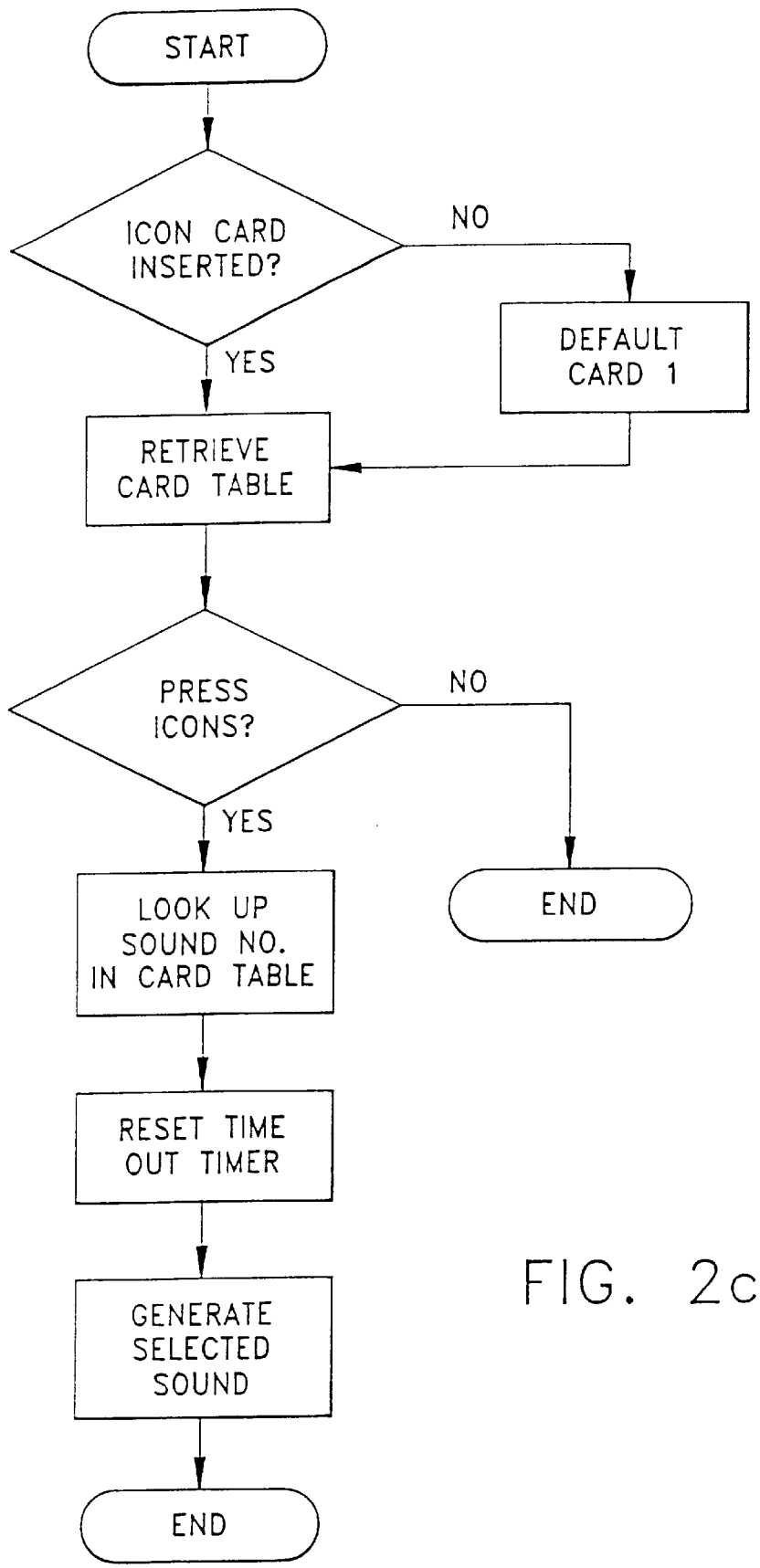
Figure 2D:
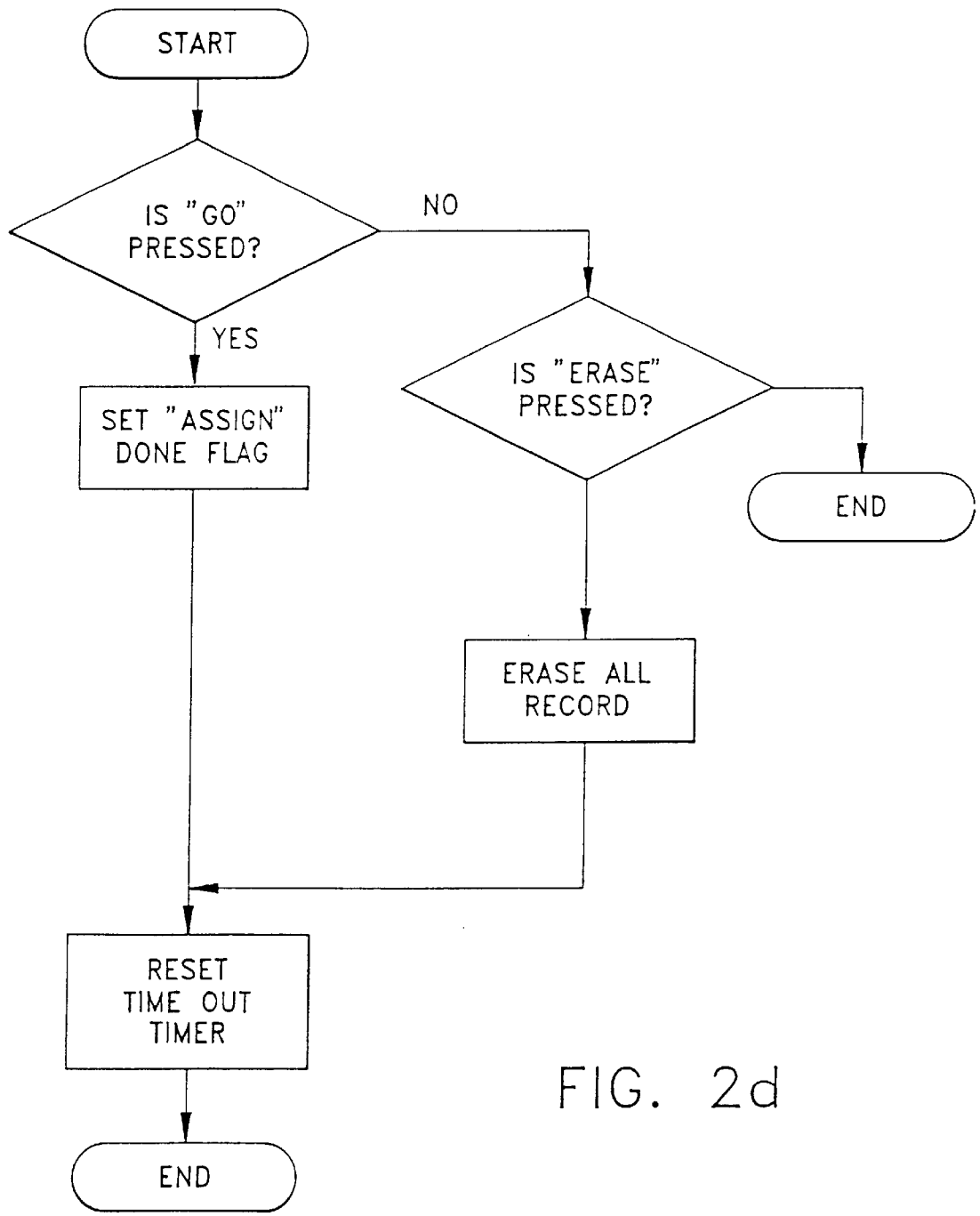
Figure 2E:
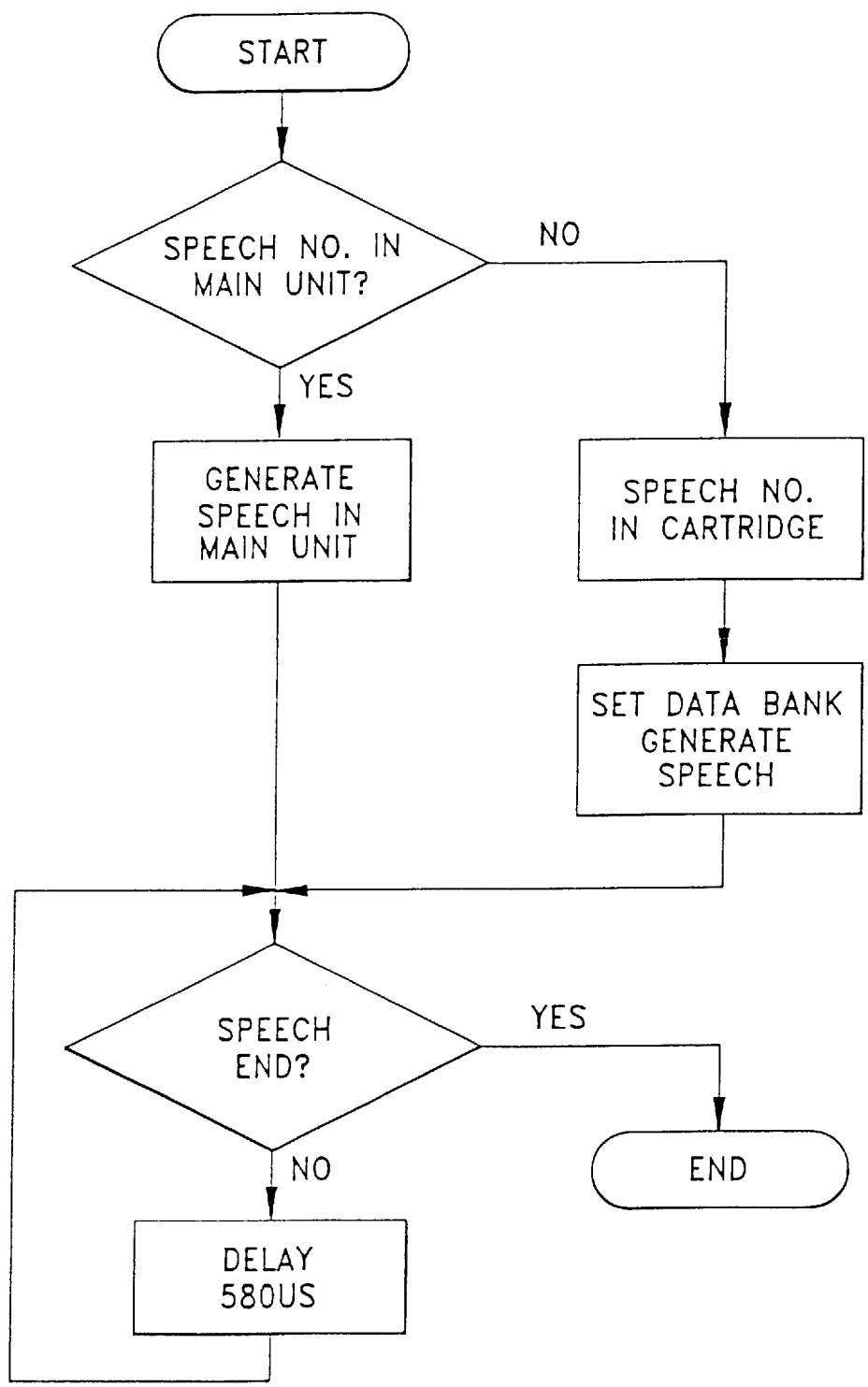

The Membrane Service routine determines whether the graphics area 16 has been pressed and saves to memory the corresponding XY coordinate. If the "assign done" flag has been set, then the routine will "Set start talk", making the system available for the Speech Service routine (FIG. 2e). If the "assign done", flag has not been set, then the Membrane Service routine saves the coordinate and resets the time-out timer. The Main routine then inquires as to whether the "assign done" flag has been set. If so, it calls the GO-ERASE Service routine (FIG. 2d). If not, the Main routine calls the Icon Service routine (FIG. 2c).

The Icon Service routine determines whether a cartridge 4, 41 has been selected and retrieves from memory a table of sounds corresponding to that cartridge. The routine first inquires whether an icon card (i.e., interchangeable cartridge 4, 41) has been inserted. If not, then the system selects a predetermined default. Otherwise, it accesses a "card table" of sounds, corresponding to the cartridge 41 that was inserted. If the icons are pressed, then the Icon Service routine looks up that sound in the card table. The system then resets the time-out timer and generates the selected sound.

The GO-ERASE Service routine (FIG. 2d) is used to indicate to the controller that either the assignment of an icon to an XY coordinate has been completed or that the existing assignment should be erased. The routine inquires as to whether the "GO" key has been pressed. The "GO" key in this embodiment is one of the control keys 5 appearing on the cartridge 4, 41. If it has not been, the system inquires as to whether the "ERASE" key has been pressed. The "ERASE" key is likewise one of the control keys 5 appearing on the cartridge 4, 41. If it has been set, then the record is erased. However, if the "GO" key had not been pressed, the "assign done" flag is set, as is the time-out timer.

If "Start talk" has been set, then the Speech Service routine (FIG. 2e) is called. The Speech Service routine first determines whether a particular sound corresponding to a particular icon is stored in the main unit 2, or in a memory device on-board the cartridge 41. It then generates the sound, either from the main unit 2 or from the cartridge 41.

Exemplary interchangeable cartridges 4, 41 are shown in FIG. 3a and FIG. 3b. Cartridges 4 in the embodiment shown in FIG. 3a can be made of simple, die-cut material, one end of which is read by port 8 through means of release spring contacts and switches. Port 8 allows the controller to determine which overlay is installed so that icons 6 will properly identify an appropriate sound effect upon pressing the key of the membrane switch 9 underlying the particular icon 6 selected. In the alternative embodiment shown in FIG. 3b, interchangeable cartridge 41 can include an electronics package 113, which can include a memory device to provide additional sound effects. In that embodiment, port 8 is a standard electronics connector, of a type well-known in the art. In that embodiment of interchangeable cartridge 41, the additional sounds can either replace the existing library of sound effects stored in the base unit 2, in either controller 106 or memory device 118 (See FIG. 6), or can be used as additional sound effects to supplement those on-board unit 2. A still further embodiment of interchangeable cartridge 4 includes an on-board microprocessor or microprocessors 114 (see FIG. 6), and can also include a memory device 116, so that a specialty program may be read and implemented by unit 2 through port 8. In that embodiment, it is possible for the program information on interchangeable cartridge 41 to supersede the programming of base unit 24, effectively replacing controller 106. In these latter two embodiments, a membrane switch 61 can be built into the cartridge 41 itself, with a printed overlay affixed atop it. Alternatively, the cartridge 41 could have a printed overlay affixed atop the base unit 2's membrane switch 9, the only membrane switch 9 being that on the base unit 24, and the electronics package 113 attached in such a manner that the printed overlay fits properly on the membrane switch 9. Finally, though the invention is shown having interchangeable cartridges of various sorts, another embodiment of the present invention contemplates the use of an on-board library and selection window 7 of sufficient size that no changing of cartridges is required. A still further embodiment of the present invention contemplates using additional cartridges 41 adapted to receive multiple icon overlays of the type described above. In such an embodiment, the cartridge 41 contains more sound effects than are conveniently displayed at one time by means of icons. Accordingly, multiple icon overlays are provided, which connect to the cartridge 41 by means of a port, similar to port 8, so that the cartridge 41 and hence unit 2 can associate the icon with the appropriate sound. Finally, provision on cartridges 4, 41 and membrane keyboard 9 can be made for additional control keys, such as "GO" and "ERASE".

Graphics tablet 16 is used to input information relating to either predetermined or user-defined graphics. It can be any device that permits the determination of XY position. One embodiment of graphics tablet 16 employs a membrane keyboard in which a plurality of closely spaced keys are employed to define an XY grid. In the alternative, graphics tablet 16 can employ an analog touch screen of a type well-known in the art. Graphics tablet 16 may also be constructed so as to provide both a menu area for selection of sound icons and a graphics area, thereby obviating the need to have a separate control window 7.

Figure 6:
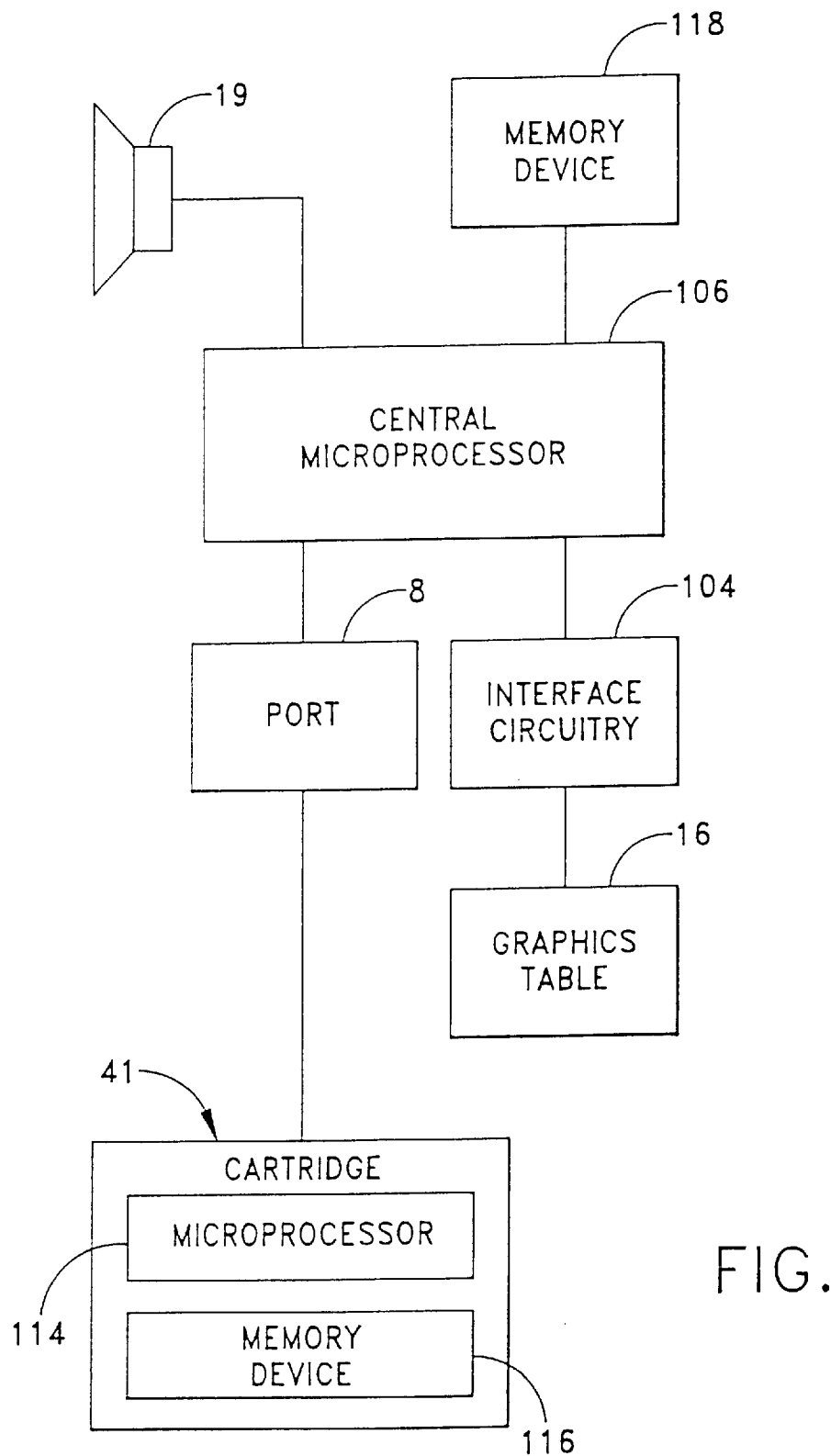
FIG. 6 is a block diagram of an embodiment of the present invention typified by FIG. 1.
Figure 7A:
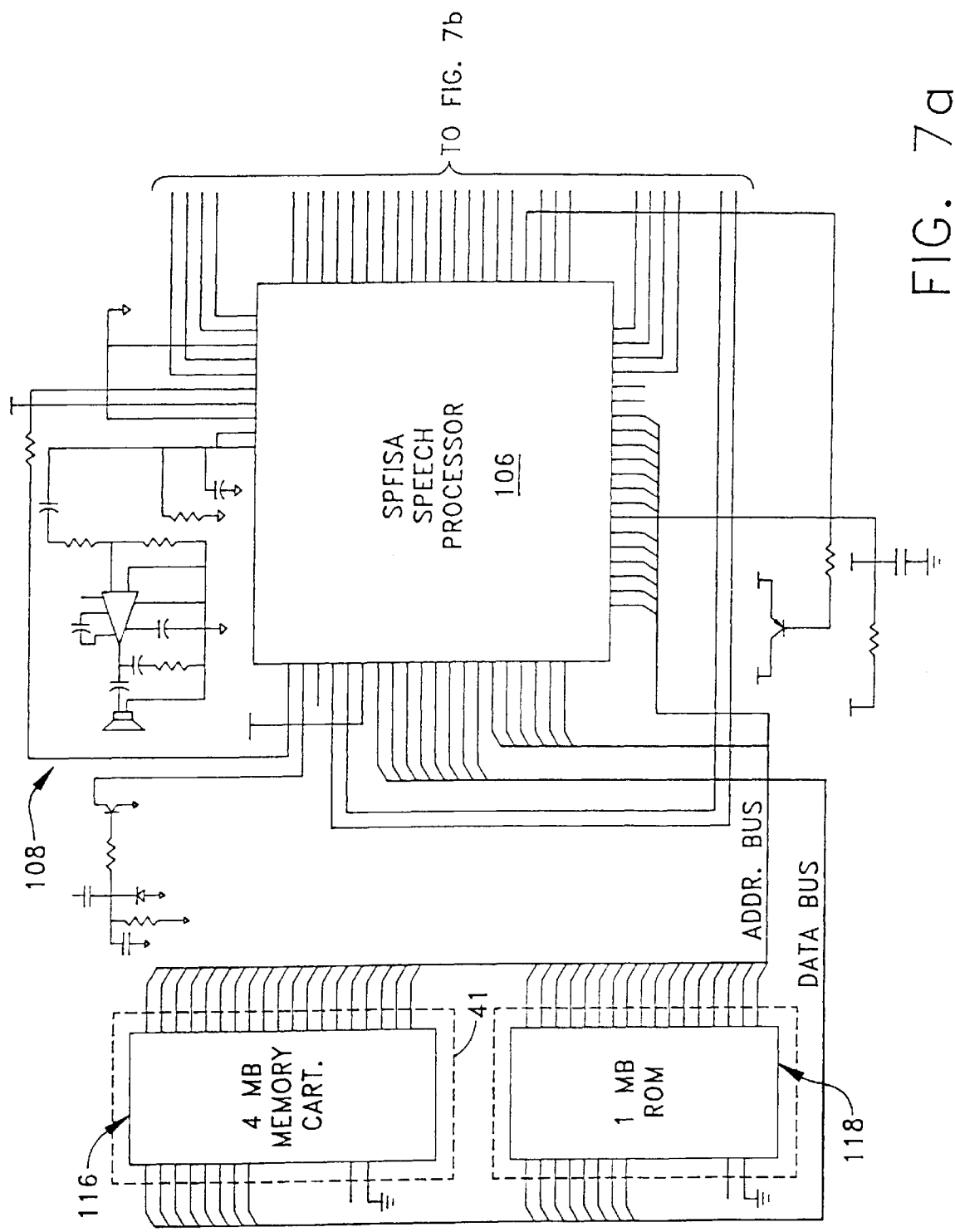
FIGS. 7a and 7b are schematic illustrations of an embodiment of the present invention typified by FIG. 1.
Figure 7B:
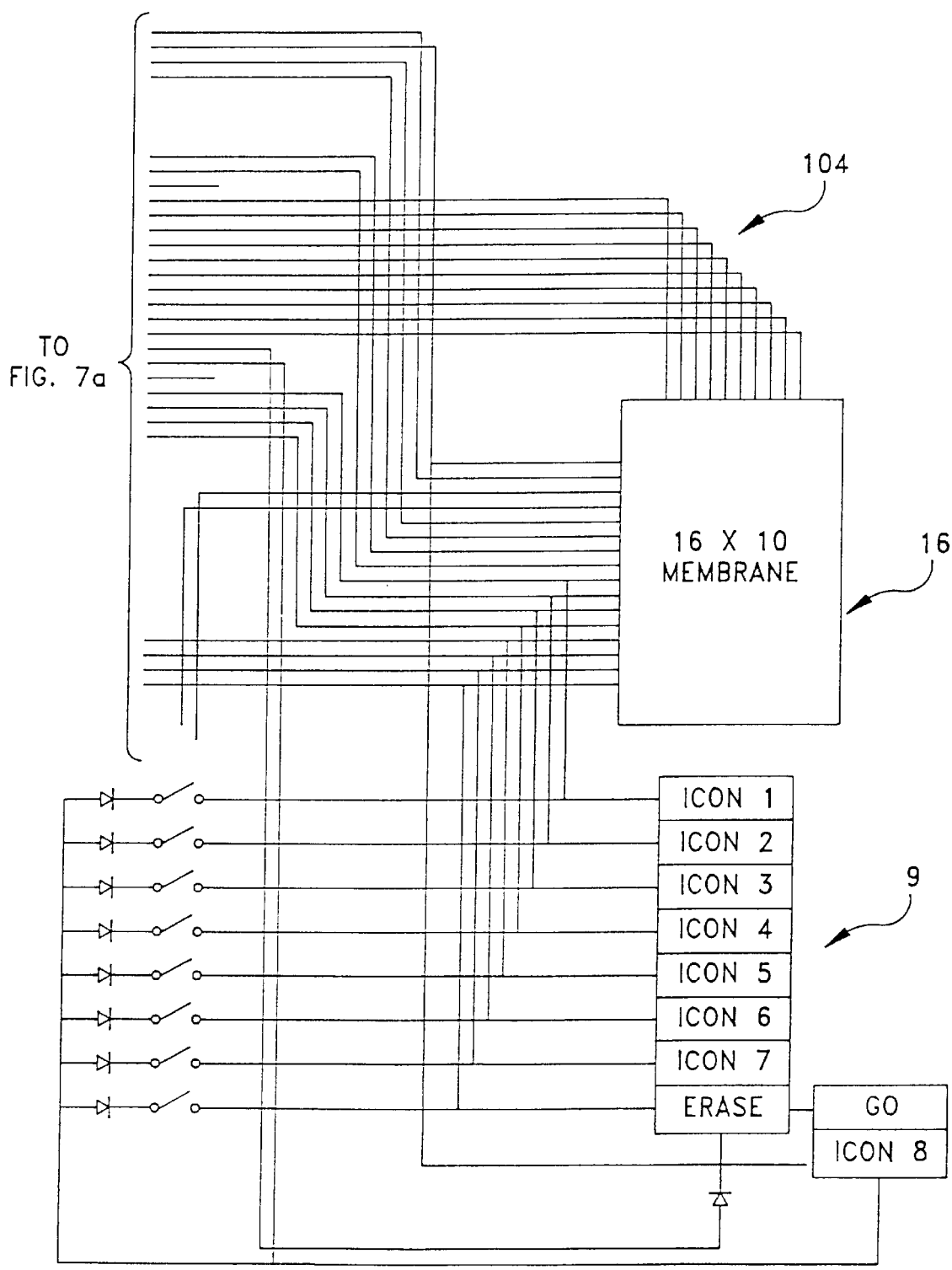

FIG. 6 shows a block diagram including the major elements of the circuitry for the embodiment of the invention discussed above. FIG. 7 shows a more detailed diagram of the circuitry shown in the block diagram. The basic elements include graphics area 16 connected by means of interface circuitry 104 to controller 106. In the embodiment shown in FIG. 7, graphics area 16 is a 16×10 membrane keyboard. Controller 106 coordinates the assignments of icons to areas on the graphics area, including determining of which cartridge is installed and hence which key is to be associated with a particular sound. Controller 106 can be, for example, a Sun-Plus microprocessor, of the sort available from Sun-Plus Electronics, of Taiwan, as is shown in FIG. 7. It should be understood, however, that while this embodiment shows the use of a single microprocessor, alternate embodiments can include a plurality. For example, an alternate embodiment of the controller 106 and interface circuitry 104 employs an 8 bit microcontroller such as the Microchip PIC16C71/S in conjunction with the Texas Instruments Speech microcontroller TSP50C14.

Controller 106 may in turn be connected to peripheral memory device 118 and also to speaker or speakers 108, which in FIG. 7 are connected to standard amplifier circuitry. Peripheral memory device 118, shown in FIG. 7 as a standard 27C1000 EEPROM, can be used to store sounds and look-up tables for identifying various cartridges 4, 41. Cartridge 41 in FIG. 7 includes memory device 116, which stores sounds and can be used either in conjunction with or in place of existing base unit memory. Cartridge 41 as shown in FIG. 6 includes an electronics module 113 that has both a microprocessor 114 and an onboard memory 116. It is to be understood, however, that cartridge 41 can alternatively include only a memory device or no memory device or electronics module at all (as in FIG. 3a) and merely include contact and switching elements for interfacing with the base unit. Another embodiment employs two types of cartridges that work together. One cartridge is just a pre-printed graphic that is die-cut in such a manner that it identifies a unique set of sound icons. The second cartridge contains an electronics package for speech and sound generation. Input of icons from cartridges 4, 41 is accomplished by means of membrane switches 9, shown in FIG. 7. Membrane switch 9 accommodates a "GO" key, an "ERASE" key, and eight icon keys 6. The "GO" and "ERASE" keys, as discussed above, inform the controller that a given area has been assigned a sound icon, or that the correlation of the icon to the area should be erased. The embodiment described above is exemplary only and not intended to limit the present invention.

Further embodiments which also are exemplary only are discussed in further detail in the examples which follow to provide additional descriptions of embodiments of the present invention.

EXAMPLE 1

Interactive Talking Story Book

The use of the present invention as an Interactive Talking Story Book is best understood with reference to FIG. 1. A cartridge 41 incorporating electronics module 113 including associated software is provided, along with a picture book 120. In one embodiment, each page of the book has reserved regions 122 indicating "Next Page" or "Previous Page". Alternatively, these controls can be on the housing of unit 2, or on cartridge 41. The system uses the "Next Page" and "Previous Page" keys to determine which page is active. The book can narrate what happens on a page, or, upon pressing a character 124 or machine, cause a sound effect corresponding to the character or machine to be emitted. In addition, the Picture Book can be configured to allow randomized dialogue from characters. For example, if the user changes the order in which he presses characters, different dialogue can be generated. Moreover, different phrases can be generated each time the user reads the book.

EXAMPLE 2

Talking Picture Phone

Figure 5:
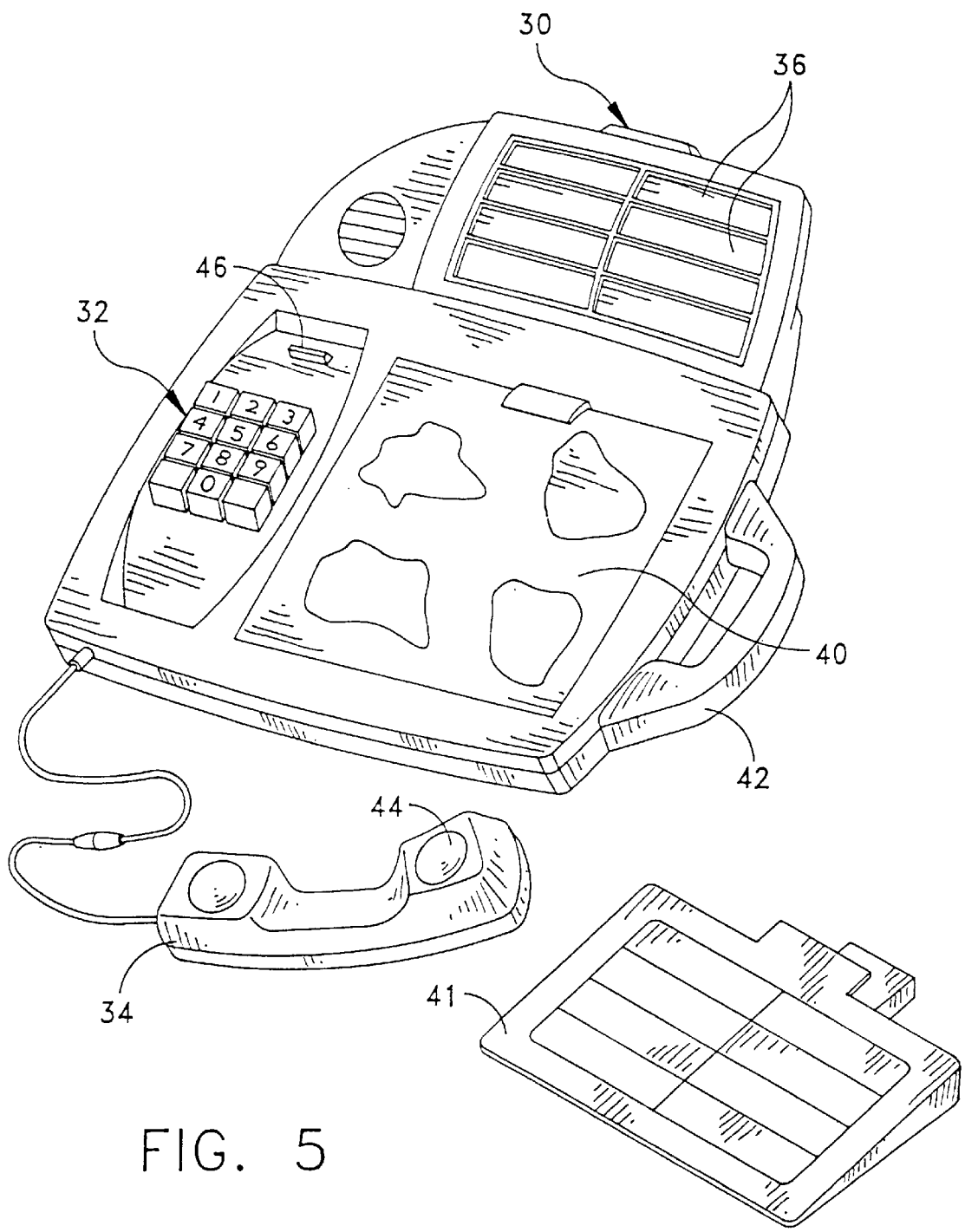
FIG. 5 is a perspective showing an alternative embodiment of the present invention.

The present invention may be configured as a Talking Picture Phone, shown in FIG. 5, having a line of standardized snap-in Talking Picture Phone Cartridges, such as identified by the numeral 30, each cartridge including an electronics module 113 that contains voice and sound effects. Each cartridge 30 also includes a series of character icons 36 printed on thin, flexible plastic. These icons do NOT cover keys—they are just representations of available characters. A 3-digit phone number is printed beside each character icon. Included on unit 42 next to graphics tablet 40 is an oversize, twelve-key telephone style keypad 32, which uses only four separate switches—keys on each row activate the same switch. Also attached is a telephone-style handpiece 34, which contains unit's speaker 44. Also included is a working "hang-up switch" 46 that can detect when the handpiece is in use.

A child's use of the Talking Picture phone embodiment is best done by giving an example of a conversation made possible using, for example, a snap-in DISNEY Talking Picture Phone Cartridge. Assume that text in italics would be spoken by the Talking Picture Phone.

| | |
|---|---|
| Child | Insert the Disney Talking Picture Phone Cartridge |
| PICTURE PHONE | Power automatically turns on. (If the cartridge were already installed, the child can simply press the ON switch.) *Draw the person you want to call, then dial their number.* |
| Child | Draws pictures of Mickey. Picks up handset. Hears Dial Tone. Dials the number printed beside Mickey on the Phone Cartridge. Phone emits dial tones while dialing, then ringing. |
| PICTURE PHONE | *This is the operator, I'm looking for Mickey . . . (pause) where is he?* |
| Child | Presses drawn picture of Mickey. (This assigns Mickey's location.) |
| PICTURE PHONE: | *This is Mickey, who's calling . . . Oh my! . . . Say, why don't you come over to play. Call Minny too and bring her with you. Bye! Click. Dial Tone.* |
| Child | Hangs up phone. Draws Minny. Picks up Phone--gets dial tone. Dials Minny's number. |
| PICTURE PHONE: | *This is the operator, I'm looking for Minny, where is she?* |
| Child | Presses Minny (assigning her location) . . . etc. |

Once assignments are made:

-continued

IF the handset is ON the hook:

Pressing one of the drawn characters makes that character call the user--Phone rings, user picks up and Mickey is there.
Dialing is locked out (the user couldn't hear it anyway--the handset is still hung up)

IF the handset is OFF the hook:

Handset will be emitting a dial tone.
Pressing one of the drawn characters "speed dials" that character -- Phone emits DTMF tones, then ringing, (or sometimes a busy signal), then, for example Mickey answers.
The child can also dial characters, but only if they have been drawn and assigned -- The child enters the character's three-digit number (as listed on the Cartridge), the phone rings (one two or three times), and is answered by the corresponding character.
If the child dials a character that has been drawn, but not assigned yet -- an operator answers and says, "This is the operator, I'm looking for _____, (pause) where is he?" (This process assigns the character to a specific touch pad location).
Hanging up the phone cancels the current dialog, call-in process, or character assignment.

The phone 42 can also call the child, but only calls from the characters that have been drawn, and only if the phone has been hung up. A contemplated embodiment also incorporates an answering machine without the use of any recording technology. When the child calls a character, e.g., Mickey, the voice could say: "Hi, this is Mickey, I'm not here now, so leave a message." The child speaks. A few minutes later the phone rings: "Hi, this is Mickey, Glad you called . . . "

A contemplated embodiment further includes a Record/Playback chips. This allows real answering machine or voice-mail features to be included.

Another embodiment incorporates conversation features into the phone. Once the characters have been assigned, this feature allows the child to hear conversations between the drawn characters, in a manner similar to a party line—the user presses any character to hear what they would say, with a script is crafted so that each phrase is randomly selected, yet context sensitive to the phrase that was spoken immediately before.

EXAMPLE 3

Story Teller

The Story Teller embodiment of the present invention is best illustrated with reference to FIG. 1. As with the previously described embodiments of the present invention, the Story Teller includes snap-in Story Cartridges 41. Each cartridge 41 includes an electronics module 113 that contains voice, sound effects, and possibly application code for the story's characters. Each cartridge 41 also includes a series of character icons 6 printed on thin, flexible material designed to overlay switches on a membrane keyboard. Also, as discussed previously, a graphics tablet 16 is provided. One of the control switches 12, 13 functions as a CONTINUE button. When the Story Cartridge is installed, the switches of the membrane keyboard become the Character Icons 6. They can be pressed at any time during the story to identify the names of the different characters.

A description of the operation of the Story Teller is best done by using the example of the "Goldilocks and the Three Bears" story. Assume that text in italics would be spoken by the STORY TELLER.

| Child | Inserts the "Goldilocks" cartridge. |
|---|---|
| STORY TELLER | Power automatically turns on. (If the cartridge were already installed, the child could simply press the ON switch.) *"Once upon a time there was a little girl named Goldilocks. What did she look like?"* |
| Child | Draws Goldilocks, then presses the CONTINUE button. (If the Character Icon Keys 6 are pressed at anytime before the CONTINUE button 13, the associated characters simply introduce themselves.) |
| STORY TELLER | *"Show me where she is"* |
| Child | Presses the picture of Goldilocks she drew. (If she presses the Goldilocks Character Icon Key. STORY TELLER responds: *"Oh sorry, (giggle), I meant press the picture you drew.)* |
| STORY TELLER | *"One day Goldilocks went for a walk in the woods. Deep in the woods she came upon a house. What's the house look like?"* |
| Child | Draws the house. (She can also press the picture of Goldilocks to repeat the last phrase. Once again, pressing any of the Icons simply identifies the Icon: (*"Hi, I'm Mamma Bear"*). When the child's ready, she presses CONTINUE. |
| STORY TELLER | *"Outside the house Goldilocks saw three bowls of porridge. A big one, a medium one, and a little one. Draw the bowls close together."* |
| Child | Draws bowls then presses CONTINUE. |
| STORY TELLER | *"Where's the biggest bowl?"* |
| Child | Press |
| STORY TELLER | *"That bowl was too hot, what about the medium size bowl?"* |
| Child | Makes mistake and presses Goldilocks. |
| STORY TELLER | (In Goldilocks' voice, laughing) *"No silly, show me the medium bowl!"* |
| Child | Presses medium bowl |
| STORY TELLER | *"That one's too cold. How 'bout the littlest one?"* |
| Child | Presses littlest bowl. |
| STORY TELLER | *"That one was just right! So Goldilocks ate it all up. When she was done eating she realized that she was getting very sleepy and to her amazement she saw three beds; a big one, a medium one and a little one. Where are they?"* |
| Child | Draws three beds. |
| STORY TELLER | *"Where's the big one?"* |
| etc . . . | |
| After a while, the child has drawn and identified all the characters. Thereafter, pressing the CONTINUE button is not required. Instead the STORY TELLER prompts the child to simply press the appropriate drawn character. The prompting can be done indirectly: "What did Papa Bear say?" | |

Other embodiments of interactive electronic devices in accordance with the present invention will be apparent to those skilled in the art from consideration of the specification and practice of the invention disclosed herein. It is intended therefore that the specification be considered as exemplary only with the true scope and spirit of the invention being indicated by the following claims:

What is claimed is:

1. A method of operating an interactive electronic story book apparatus comprising the steps of:

providing a story book including a plurality of pages having graphic characters depicted thereon;

providing a touch sensitive graphics area;

overlying said story book on said touch sensitive graphics area;

providing a plurality of speech phrases in a memory device associated with said touch sensitive graphics area, said speech phrases being associated with predetermined characters on predetermined pages of said story book;

opening said story book to one of said plurality of pages;

associating a predetermined group of speech phrases with said open page of said story book;

assigning said speech phrases to predetermined areas on said touch sensitive graphics area which correspond with the location of said characters on said open page of said story book; and selectively outputting said speech phrases responsive to touch input derived from said predetermined area of said touch sensitive graphics area.

2. The method of claim 1 wherein said speech phrases are assigned in a random order among the characters on the page responsive to a first touch input derived from the operator, said random ordering creating a random dialogue among the characters as subsequent touch input is derived from the operator.

3. The method of claim 2 wherein the assignment of said speech phrases is changed responsive to subsequent touch input derived from the operator.

4. The method of claim 1 wherein said speech phrases are assigned in a predetermined order among the characters on the page responsive to a first touch input derived from the operator, said predetermined ordering creating a predetermined dialogue among the characters as subsequent touch input is derived from the operator.

5. The method of claim 4 wherein the assignment of said speech phrases is changed responsive to subsequent touch input derived from the operator.

* * * * *